United States Patent
Sinha

[19]

[11] Patent Number: 6,001,152
[45] Date of Patent: Dec. 14, 1999

[54] FLUE GAS CONDITIONING FOR THE REMOVAL OF PARTICULATES, HAZARDOUS SUBSTANCES, $NO_X$, AND $SO_X$

[76] Inventor: Rabindra K. Sinha, 103 Lansdowne Dr., Moon Township, Pa. 15108

[21] Appl. No.: 08/865,622

[22] Filed: May 29, 1997

[51] Int. Cl.$^6$ ................................................. B03C 3/013
[52] U.S. Cl. ............... 95/58; 95/71; 95/92; 95/129; 95/137; 96/52; 96/74; 96/108; 110/216; 110/345; 423/239.1; 423/244.01
[58] Field of Search .................... 95/58, 71, 72, 95/92, 128, 129, 135, 137; 96/27, 52, 53, 74, 108; 423/213.5, 239.1, 244.01; 502/330; 110/216, 345

[56] References Cited

U.S. PATENT DOCUMENTS

| | | | |
|---|---|---|---|
| 3,900,554 | 8/1975 | Lyon | 423/235 |
| 3,924,157 | 12/1975 | Peters et al. | 95/71 X |
| 4,042,348 | 8/1977 | Bennett et al. | 95/60 |
| 4,070,162 | 1/1978 | Kober et al. | 55/DIG. 25 |
| 4,113,447 | 9/1978 | Bennett et al. | 95/60 |
| 4,123,234 | 10/1978 | Vossos | 95/61 |
| 4,141,697 | 2/1979 | Albanese | 95/61 |
| 4,147,521 | 4/1979 | Albanese | 95/61 |
| 4,177,043 | 12/1979 | Albanese | 95/71 |
| 4,208,386 | 6/1980 | Arand et al. | 423/235 |
| 4,238,203 | 12/1980 | Jaworowski et al. | 95/60 |
| 4,239,504 | 12/1980 | Polizzotti et al. | 95/58 |
| 4,291,004 | 9/1981 | McCaffrey et al. | 210/732 X |
| 4,294,588 | 10/1981 | Polizzotti et al. | 95/58 |
| 4,306,885 | 12/1981 | Kober et al. | 95/60 |
| 4,325,924 | 4/1982 | Arand et al. | 423/235 |
| 4,352,747 | 10/1982 | Every et al. | 110/342 X |
| 4,384,968 | 5/1983 | Polizzotti et al. | 110/215 X |
| 4,409,192 | 10/1983 | Lichtner et al. | 423/242.7 |
| 4,428,866 | 1/1984 | Every et al. | 110/345 X |
| 4,439,351 | 3/1984 | Sinha | 110/344 X |
| 4,497,783 | 2/1985 | Barber | 423/213.5 |
| 4,526,703 | 7/1985 | Gebhard et al. | 252/189 |
| 4,681,687 | 7/1987 | Mouché et al. | 422/5 X |
| 4,719,092 | 1/1988 | Bowers | 423/235 |
| 4,751,065 | 6/1988 | Bowers | 423/235 |
| 4,793,981 | 12/1988 | Doyle et al. | 423/239.1 |
| 4,793,982 | 12/1988 | Lin et al. | 423/243.01 |
| 5,120,517 | 6/1992 | Elshout | 423/239.1 |
| 5,165,902 | 11/1992 | Bortz et al. | 423/235 |
| 5,213,779 | 5/1993 | Kay et al. | 423/244.02 X |
| 5,256,198 | 10/1993 | Sinha | 264/DIG. 49 |
| 5,311,829 | 5/1994 | Clark et al. | 110/345 |
| 5,370,720 | 12/1994 | Duncan | 96/27 X |
| 5,380,692 | 1/1995 | Nakatsuji et al. | 502/330 X |
| 5,512,257 | 4/1996 | Frey | 210/912 X |
| 5,538,703 | 7/1996 | Flytzani-Stephanopoulos | 423/244.02 X |
| 5,567,226 | 10/1996 | Lookman et al. | 95/3 |

OTHER PUBLICATIONS

Levin, E. M. et al., Phase Diagrams for Ceramists, Ohio, American Ceramic Society, 1964, vol. 1, pp. 322–339. Ref. QD 501.P3835.

(List continued on next page.)

Primary Examiner—Richard L. Chiesa
Attorney, Agent, or Firm—Jones, Day, Reavis & Pogue

[57] ABSTRACT

The present invention provides compositions including a salt selected from the group consisting essentially of sodium nitrate, sodium nitrite, ammonium nitrate, lithium nitrate, barium nitrate, cerium nitrate, and mixtures thereof, as flue gas conditioning formulations for use in controlling particulates, hazardous substances, $NO_x$, and $SO_x$. For the purpose of obtaining greater yields of particulate and hazardous substance removal, the compositions may further include a polyhydroxy compound, preferably selected from the group consisting essentially of sucrose, fructose, glucose, glycerol, and mixtures thereof. Methods are also provided for adding these compositions to the flue gas stream to control particulate, hazardous substance, $NO_x$, and $SO_x$ emissions.

51 Claims, 4 Drawing Sheets

OTHER PUBLICATIONS

Wendt, J. Q. J. et al., Effect of Ammonia in Gaseous Fuels On Nitrogen Oxide Emissions, *Journal of the Air Pollution Control Association,* vol. 24, No. 11 (Nov. 1974), pp. 1055–1058.

Teixeira, D. P., The Proceedings of the NOx Control Technology Seminar, Special Report No. EPRI SR–39, California, Electric Power Research Institute, Feb. 1976. Reproduced by U.S. Dep't of Commerce, National Technical Information Service PB–253 661.

Minton, P.E. et al., "Heat Exchange Technology (Nonwater Media)." in: *Encyclopedia of Chemical Technology* (3d ed.), vol. 12, pp. 171–191. Ref. TP9.E685 1978.

Elliott, M. A., "Control of Pollution from Combustion Processes (Sulfur Oxides)." in: *Chemistry of Coal Utilization* (New York, John Wiley & Sons, 1981), 2d supp. vol., pp. 1462–1490. Ref. TP953.N3 (1981 supp.).

O'Sullivan, D., Method Uses Urea To Rid Flue Gas of NOx, *Chemical & Engineering News,* (Apr. 18, 1988) p. 22.

Markussen, J. M. et al., Performance of Soda Ash–Lime Sorbents in Small–Scale Spray Dryer. Air & Waste Management Association, Jun. 1989, Report No. 89–19.2, presented at 82nd annual meeting & exhibition in Anaheim, California.

Frank, N. W. et al., The Use of Electrons for Removal of $SO_2$ and NOx Fom Flue Gases. Air & Waste Management Association, Jun. 1989, Report No. 89–19.3, presented at 82nd annual meeting & exhibition in Anaheim, California.

Landreth, R. R. et al., Retrofit of Sorbent Injection Technology on an Older Coal Fired Boiler. Air & Waste Management Association, Jun. 1989, Report No. 89–19.4, presented at 82nd annual meeting & exhibition in Anaheim, California.

Pease, R. R. et al., Industrial Boilers: Status of Oxides of Nitrogen Regulations and Control Technology in the South Coast Air Quality Management District. Air & Waste Management Association, Jun. 1989, Report No. 89–19.5, presented at 82nd annual meeting & exhibition in Anaheim, California.

Brinkmann, P. E. et al., NOx Emission Reduction From Gas Fired Steam Generators. Air & Waste Management Association, Jun. 1989, Report No. 89–19.6, presented at 82nd annual meeting & exhibition in Anaheim, California.

Davis, M. L. et al., Choosing a Technology for Simultaneous Control of NOx/SOx From Industrial Boilers. Air & Waste Management Association, Jun. 1989, Report No. 89–19.8, presented at 82nd annual meeting & exhibition in Anaheim, California.

Grisso, J. R. et al., Operating Experience With SCR for NOx Emission Control, ASME Industrial Power Conference, Oct. 1990, presented in St. Louis, Missouri.

Epperly, W. R., The World of NOx Reduction Chemicals. *Chemtech* (Jul. 1991), pp. 429–431.

Campbell, L.M. et al., *Source book: NOx Control Technology Data.* North Carolina, Jul. 1991. Air & Energy Engineering Research Laboratory, EPA–600/2–91–029, Reproduced by U.S. Dep't of Commerce, National Technical Information Service PB91–217364.

Makansi, J., Reducing NOx Emission From Today's Powerplants. *Power* (May 1993), special report, pp. 11–28.

Prasad, A., Air Pollution Control Technologies for Nitrogen Oxides. *The National Environmental Journal* (May/Jun. 1995) pp. 46–50.

FLUE GAS CONDITIONING FOR THE REMOVAL OF PARTICULATES, HAZARDOUS SUBSTANCES, $NO_x$, AND $SO_x$

BACKGROUND OF THE INVENTION

This invention relates to emission control for combustion apparatus burning carbonaceous fuels and, more particularly, to compositions and methods for the enhanced removal of particulates, hazardous substances, nitrogen oxides, and sulfur oxides from a flue gas stream resulting from the combustion of these fuels.

Environmental regulations require that emissions of certain materials in flue gases be kept at levels not exceeding those set forth in federal, state, and local specifications. To comply with these legal mandates, particulate emissions must satisfy certain standards in terms of pounds per million Btu input, pounds per unit time, and opacity of stack effluent. The term "particulate" within the meaning of these restrictions generally refers to fly ash and other fine particles found in flue gas streams and can include a host of hazardous substances, such as those listed in 40 CFR § 302.4 (e.g., arsenic, ammonia, ammonium sulfite, mercury, and the like).

Acidic gases are also found in flue gas streams. Whenever sulfur-containing fuels are burned, sulfur is converted to sulfur dioxide and sulfur trioxide (together known as "$SO_x$") and released into the atmosphere along with other flue gases and entrained particulate and hazardous substance materials. Combustion of carbonaceous fuels also results in the formation of nitric oxide and nitrogen dioxide (together known as "$NO_x$"), which also exit the stack with the combustion exhaust materials. However, as in the case of particulates, the emissions of both $NO_x$ and $SO_x$ are subject to certain output standards because of acid rain legislation and mandatory ambient air quality criteria. Therefore, at least with respect to $SO_x$, one is required to burn low-sulfur fuels to ensure compliance with $SO_x$ emission requirements. This adversely affects older emission control devices that were originally designed to work in units burning higher-sulfur fuels. There are also enormous costs associated with transporting low-sulfur fuels to locations where such fuels are not found in abundance.

The method of improving particulate control known as flue gas conditioning is generally understood as adding a chemical into the flue gas streams of boilers, turbines, incinerators, and furnaces to improve the performance of downstream emission control devices. Although the term is usually associated with the removal of particulates caused by coal combustion, flue gas conditioning can be equally effective in controlling particulates caused by the burning of any carbonaceous fuel. As this invention illustrates, flue gas conditioning can also be used to remove hazardous substances, $NO_x$, and $SO_x$ from the flue gas stream.

The performance of downstream emission control devices, such as electrostatic precipitators, often depends upon the chemistry of the flue gases and, in particular, such factors as the fuel sulfur content, particulate composition, particulate resistivity, and the cohesion properties of entrained particulates, to name a few. Chemical additives either to the fuel prior to combustion or to the flue gas stream prior to the electrostatic precipitator can correct the deficiencies of the precipitator to meet particulate emissions standards (e.g., mass emission and visual opacity). One of the objects of flue gas conditioning is to enhance the effectiveness of the electrostatic precipitation process by manipulating the chemical properties of the materials found in the flue gas stream.

Gases, such as ammonia and sulfur trioxide, when injected into the flue gas stream prior to a cold-side electrostatic precipitator, have been known to condition the fly ash for better precipitator performance. Similar results have been obtained with inorganic chemical compounds, such as ammonium sulfate, sodium bisulfate, sodium phosphate, or ammonium phosphate. The use of sulfuric acid has also been proposed, as well as mixtures of these inorganic compounds in the form of undisclosed "proprietary blends." These compounds have been added either as a powder or as an aqueous solution to the flue gas stream.

Organic compounds, such as ethanol amine and ethanol amine phosphate, have also been used as flue gas conditioning agents. Free-base amino alcohols, such as morpholine (including morpholine derivatives), have been used as well to augment the flow characteristics of treated fly ash. Similarly, the use of alkylamine (such as tri-n-propylamine) and an acid containing sulfur trioxide (such as sulfamic acid) has been proposed to lower the resistivity of fly ash.

Anionic polymers have been employed in situations where the fly ash resistivity needs to be lowered, particularly when a low-sulfur coal is utilized. Similarly, cationic polymers have been suggested whenever the electrical resistivity needs to be raised from a low value, such as when using high-sulfur coal. Anionic polymers containing ammonium and sodium nitrate have also been known to increase the porosity of fly ash for principal application in bag houses.

The use of inorganic salts, such as sodium sulfate, sodium carbonate, or sodium bicarbonate added directly to the coal before combustion has been known to correct the "sodium depletion" problems of a hot-side precipitator. Sodium carbonate and sodium bicarbonate have also been injected directly into the flue gas stream prior to the hot-side precipitator, but this mode of application has not been commercialized.

The principal post-combustion method for controlling $S_x$ emissions involves the saturation of basic chemicals with the flue gases through the use of a "scrubber." In this removal method, advantage is taken from the fact that $SO_x$ is acidic in nature and will react with basic additives to form an innocuous sulfate. Essentially, the principle underlying the various forms of scrubber technologies is to utilize simple acid-base reactions to control $SO_x$ emissions. However, conventional scrubber designs are very capital intensive to build and remain expensive to operate in terms of labor, energy, and raw material costs.

There are many types of scrubbers currently in use. In wet scrubbers (which are normally located after the emission control device), the flue gas is brought into direct contact with a scrubbing fluid that is composed of water and a basic chemical such as limestone (calcium carbonate), lime, caustic soda, soda ash, and magnesium hydroxide/carbonate, or mixtures of these. Water-soluble nitrite salts have also been added to the scrubbing medium for the purpose of enhancing the $SO_x$-removal efficiency of wet scrubbers. The use of organo phosphonic acid in conjunction with water-based solutions or slurries that react with sulfur dioxide have been known to improve the utilization of the basic material in a wet scrubber. Similarly, polyethylene oxide compounds have been added to the flue gas as a sludge de-watering agent for improving the wet scrubber's efficiency.

In dry scrubbers, slurries of lime or mixtures containing lime and other basic chemicals are injected into the flue gas stream as sprays. Unlike the wet scrubbers, the injection of these chemicals in dry scrubbers is usually conducted before the emission control device. After injection, the unreacted chemicals and reaction products become entrained with the flue gas stream and are separated from the flue gas along with other particulates in the downstream emission control device using common particulate removal techniques. However, a problem encountered with this method of $SO_x$ removal is that the unreacted chemicals and reaction products cause a very heavy particulate load on the downstream emission control device. This method of removal is also less efficient than wet scrubbing techniques due to the low reaction rates between sulfur dioxide and the dry scrubbing additives.

Because of its very high reaction rate with sulfur dioxide, a compound known as "trona" (a hydrous acid sodium carbonate) has also been injected into the flue gas stream in dry scrubbers (upstream from the emission control device) in an effort to reduce $SO_x$ emissions. Unfortunately, trona produces an undesirable side effect—it provokes $NO_2$ formation, which is another pollutant that is very visible in the plume by its characteristic brown, aesthetically unacceptable color. Notwithstanding its low cost, therefore, trona has not acquired much popularity.

The use of soda ash (anhydrous sodium carbonate), caustic soda (sodium hydroxide), and calcium hydroxide in dry and wet scrubbers has also proven effective in reducing $SO_x$ emissions. However, these strong bases have achieved limited commercial success because of high raw material costs. For example, 1.25 tons of caustic soda is required for removing every ton of sulfur dioxide produced. For a 500-megawatt power station burning 2% sulfur coal, it would require 270 tons of soda per day to keep $SO_x$ emissions within acceptable levels.

As mentioned previously, $NO_x$ is also produced during the combustion of carbonaceous fuels. $NO_x$ is generated by several means, such as the fixation of nitrogen present in combustion gases, the conversion of fuel-derived nitrogen, and prompt $NO_x$ formation. Prompt $NO_x$ formation is a small contributor and only occurs under very fuel-rich operations.

There are several methods by which $NO_x$ emissions have been controlled. One of these methods include the injection of ammonia directly into the combustion chamber. Maintaining a close temperature control between 1650° F. to 1832° F. is essential under this technique; otherwise, the desired $NO_x$ removal will not occur, and there will be an excessive emission of unreacted ammonia. Excessive emissions of unreacted ammonia from the combustion chamber (known as "ammonia slippage") not only adds to pollution but also causes pluggage of downstream equipment. Ammonia slippage thus becomes a problem in its own right.

In another method for $NO_x$ removal, known as "SCR" or selective catalytic reduction, ammonia is added to the flue gas stream at temperatures above 800° F. The mixed stream is then passed over a catalyst where the $NO_x$ removal process is effected. Despite being the most expensive technology, based both on initial capital and operating costs, this method has provided the best removal rates of $NO_x$ (removal rates of 90% to 99% are common). Unfortunately, however, the catalysts are subject to degradation over time, as well as poisoning by sulfur-containing gases and poisoning and blinding by fly ash.

In yet another method, known as "SNCR" or selective non-catalytic reduction, urea (or its precursors) is injected into the flue gas stream at temperatures between 1600° F. to 1800° F. As in the case of the ammonia-injection method for $NO_x$ control, however, the SNCR process must operate in a narrow temperature window or else ammonia slippage will occur or too little $NO_x$ reduction will be achieved. Although combinations of SNCR and SCR have been proposed, they have presented similar limitations.

Unlike the aforementioned emission control methods, use of the compositions of the present invention provides an effective, efficient, and low-cost means for controlling particulate, hazardous substance, $NO_x$, and $SO_x$ emissions without exhibiting any of the above limitations. Moreover, use of the invention compositions fills an important need by reducing these emissions simultaneously. Because of these desirable characteristics, the present invention constitutes a significant advancement over prior emission control techniques.

SUMMARY OF THE INVENTION

The present invention provides compositions and methods for flue gas conditioning to enhance the performance of downstream emission control devices in removing particulates and hazardous substances from a flue gas stream, preferably while simultaneously removing $NO_x$ and $SO_x$ emissions. Although it is preferred that the invention compositions be added to the flue gas stream at a point upstream from the emission control device, $NO_x$ and/or $SO_x$ reduction is still possible without regard to the location at which these compositions are introduced into the flue gas stream.

The simultaneous removal of particulates and hazardous substances is accomplished by adding a composition to the flue gas stream that comprises a salt selected from the group consisting essentially of sodium nitrate, sodium nitrite, ammonium nitrate, lithium nitrate, and mixtures thereof, provided that the composition does not comprise ammonium nitrate and sodium nitrite at the same time. To simultaneously remove particulates, hazardous substances, and $NO_x$, the composition added to the flue gas stream comprises cerium nitrate and a salt selected from the group consisting essentially of sodium nitrate, sodium nitrite, ammonium nitrate, lithium nitrate, and mixtures thereof, provided that the composition does not comprise ammonium nitrate and sodium nitrite at the same time and further provided that the composition consists of a dry powder when sodium nitrite is present. For simultaneously removing particulates, hazardous substances, and $SO_x$, the composition added to the flue gas stream comprises a salt selected from the group consisting essentially of sodium nitrate, sodium nitrite, ammonium nitrate, lithium nitrate, barium nitrate, and mixtures thereof, provided that the composition does not comprise ammonium nitrate and sodium nitrite at the same time and further provided that the composition consists of a dry powder when both sodium nitrite and barium nitrate are present. Finally, simultaneous particulate, hazardous substance, $NO_x$, and $SO_x$ removal is achieved by adding to the flue gas stream a composition that comprises cerium nitrate and a salt selected from the group consisting essentially of sodium nitrate, sodium nitrite, ammonium nitrate, lithium nitrate, barium nitrate, and mixtures thereof, provided that the composition does not comprise ammonium nitrate and sodium nitrite at the same time and further provided that the composition consists of a dry powder when sodium nitrite is present. For the purpose of obtaining greater yields of particulate and hazardous substance removal, each of the above compositions may further comprise a polyhydroxy compound, preferably selected from the group consisting essentially of sucrose, fructose, glucose, glycerol, and mixtures thereof.

The introduction of the invention compositions into the flue gas stream for the purpose of particulate and hazardous substance removal is primarily intended to enhance the performance of electrostatic precipitators. However, the compositions of the invention may also be used to enhance the performance of cyclones, multi-clones, bag houses, and other emission control devices, because the compositions are designed to increase the cohesion properties of the particulates and hazardous substances entrained in the flue gas stream.

These and other aspects and advantages of the present invention will become better understood with reference to the following description, examples, drawings and appended claims.

DETAILED DESCRIPTION OF THE INVENTION

The compositions of the invention comprise one or more of the nitrates of sodium, ammonium, lithium, barium, and cerium and may also comprise sodium nitrite. For enhanced removal of particulates and hazardous substances, the compositions preferably further comprise a polyhydroxy compound, such as sucrose, fructose, glucose, glycerol, and mixtures thereof. Depending upon how these salts and polyhydroxy compounds are combined, their introduction into the flue gas stream is effective to enhance the performance of electrostatic precipitators in removing particulates and hazardous substances while simultaneously reducing either $NO_x$ or $SO_x$ (or both) from the flue gases.

The invention compositions enhance the performance of electrostatic precipitators in removing particulates by lowering the electrical resistivity of entrained particulate materials and by increasing their cohesivity. Lowering the resistivity improves the initial collection efficiency of these precipitators, and increasing the cohesivity promotes the subsequent retention of the collected particulates. The compositions of the invention lower the high and low-temperature resistivity of particulates by raising their sodium and/or lithium levels and by increasing the amount of sulfur trioxide in the flue gas stream. The invention compositions also improve the cohesivity of particulates by enhancing their moisture-absorption capacities and by adding a molten composition to the particulate-laden flue gas stream. All of these factors combine to maximize electrostatic precipitator performance. There may also be other less-understood secondary factors by which the invention compositions enhance the performance of the electrostatic precipitator.

The invention compositions also facilitate the removal of hazardous substances. Hazardous substances often appear in the flue gas stream as solids or are absorbed or become otherwise attached to entrained particulates. If the hazardous substances appear in either of these forms, the downstream electrostatic precipitator will collect the hazardous substances using the same enhanced technique for removing particulates outlined above. However, if the hazardous substances appear in the flue gas stream as a vapor, the principles underlying their removal are different.

Because vaporous hazardous substances generally have low vapor pressures, bringing them into contact with a cool surface causes them to condense to a liquid or solid form. When the invention compositions are added as atomized aqueous solutions that form microscopic droplets in the flue gas stream, the water from the droplets evaporates and the droplets cool for a brief period of time to a temperature below that of the flue gas stream, thereby providing the cool surface needed for condensation of the vaporous hazardous substances. The hazardous substances are thus adsorbed onto and entrapped by the droplets. Because the invention compositions have low melting points, the droplets remain in liquid form in the hot flue gas stream and continue to adsorb and entrap the condensed hazardous substances until such time as the droplets are separated from the flue gas stream in the downstream electrostatic precipitator.

The compositions of the invention also enable the simultaneous removal of acidic gases, such as $NO_x$ or $SO_x$, from the flue gas stream. To simultaneously remove particulates, hazardous substances, and $NO_x$, the composition added to the flue gas stream must at least comprise cerium nitrate. By the same token, the composition should comprise barium nitrate whenever the simultaneous removal of particulates, hazardous substances, and $SO_x$ is desired. However, unlike the requirement for cerium nitrate in $NO_x$ removal, the presence of barium nitrate is not absolutely necessary because some degree of $SO_x$ removal will occur even if that nitrate is omitted from the composition added to the flue gas stream. Nevertheless, the preferred embodiment is for the composition to comprise barium nitrate whenever $SO_x$ removal is sought to be achieved.

To simultaneously remove particulates, hazardous substances, $NO_x$, and $SO_x$ the composition added to the flue gas stream comprises cerium nitrate (for $NO_x$ removal) and should preferably further comprise barium nitrate (for $SO_x$ removal) and one or more of the other nitrite and nitrate salts disclosed herein. The composition may further comprise a polyhydroxy compound for the purpose of obtaining enhanced particulate and hazardous substance removal.

Proper dispersion of the invention compositions in the flue gas stream is important for obtaining effective results. Adequate dispersion is accomplished by atomizing the composition as it is being introduced into the flue gas stream. Two-fluid atomization (where compressed air or steam comprises the fluid other than the invention composition) is satisfactory, although other methods may also be used for achieving good atomization. Generally, compressed air is preferred over steam whenever the invention compositions are added to the flue gas stream in the form of a dry powder.

There are a number of ways in which the salts and polyhydroxy compounds disclosed herein may be combined for obtaining enhanced emission control. Indeed, enhanced emission control will occur even if one or more of the salts disclosed herein (e.g., sodium nitrate, sodium nitrite, or ammonium nitrate) are omitted from the composition that is ultimately added to the flue gas stream. Nevertheless, the following formulations have been determined by laboratory and field tests to be the ones most likely to achieve favorable emission reduction:

Formulation I: $NaNO_3$, $NH_4NO_3$, and $LiNO_3$.

Formulation II: $NaNO_3$, $NH_4NO_3$, $LiNO_3$, and a polyhydroxy compound.

Formulation III: $NaNO_3$, $NH_4NO_3$, and $Ce(NO_3)_3$.

Formulation IV: $NaNO_3$, $NH_4NO_3$, $Ce(NO_3)_3$, and a polyhydroxy compound.

Formulation V: $NaNO_3$, $NH_4NO_3$, $LiNO_3$, and $Ce(NO_3)_3$.

Formulation VI: $NaNO_3$, $NH_4NO_3$, $LiNO_3$, $Ce(NO_3)_3$, and a polyhydroxy compound.

Formulation VII: $NaNO_3$, $NH_4NO_3$, and $Ba(NO_3)_2$.

Formulation VIII: $NaNO_3$, $NH_4NO_3$, $Ba(NO_3)_2$, and a polyhydroxy compound.

Formulation IX: $NaNO_3$, $NH_4NO_3$, $LiNO_3$, and $Ba(NO_3)_2$.

Formulation X: $NaNO_3$, $NH_4NO_3$, $LiNO_3$, $Ba(NO_3)_2$, and a polyhydroxy compound.

Formulation XI: $NaNO_3$, $NH_4NO_3$, $Ba(NO_3)_2$, and $Ce(NO_3)_3$.

Formulation XII: $NaNO_3$, $NH_4NO_3$, $Ba(NO_3)_2$, $Ce(NO_3)_3$, and a polyhydroxy compound.

Formulation XIII: $NaNO_3$, $NH_4NO_3$, $LiNO_3$, $Ba(NO_3)_2$, and $Ce(NO_3)_3$.

Formulation XIV: $NaNO_3$, $NH_4NO_3$, $LiNO_3$, $Ba(NO_3)_2$, $Ce(NO_3)_3$, and a polyhydroxy compound.

Formulation XV: $NaNO_3$, $NaNO_2$, and $LiNO_3$.

Formulation XVI: $NaNO_3$, $NaNO_2$, $LiNO_3$, and a polyhydroxy compound.

Formulation XVII: $NaNO_3$, $NaNO_2$, and $Ce(NO_3)_3$ (dry powder).

Formulation XVIII: $NaNO_3$, $NaNO_2$, $Ce(NO_3)_3$, and a polyhydroxy compound (dry powder).

Formulation XIX: $NaNO_3$, $NaNO_2$, $LiNO_3$, and $Ce(NO_3)_3$ (dry powder).

Formulation XX: $NaNO_3$, $NaNO_2$, $LiNO_3$, $Ce(NO_3)_3$, and a polyhydroxy compound (dry powder).

Formulation XXI: $NaNO_3$, $NaNO_2$, and $Ba(NO_3)_2$ (dry powder).

Formulation XXII: $NaNO_3$, $NaNO_2$, $Ba(NO_3)_2$, and a polyhydroxy compound (dry powder).

Formulation XXIII: $NaNO_3$, $NaNO_2$, $LiNO_3$, and $Ba(NO_3)_2$ (dry powder).

Formulation XXIV: $NaNO_3$, $NaNO_2$, $LiNO_3$, $Ba(NO_3)_2$, and a polyhydroxy compound (dry powder).

Formulation XXV: $NaNO_3$, $NaNO_2$, $Ba(NO_3)_2$, and $Ce(NO_3)_3$ (dry powder).

Formulation XXVI: $NaNO_3$, $NaNO_2$, $Ba(NO_3)_2$, $Ce(NO_3)_3$, and a polyhydroxy compound (dry powder).

Formulation XXVII: $NaNO_3$, $NaNO_2$, $LiNO_3$, $Ba(NO_3)_2$, and $Ce(NO_3)_3$ (dry powder).

Formulation XXVIII: $NaNO_3$, $NaNO_2$, $LiNO_3$, $Ba(NO_3)_2$, $Ce(NO_3)_3$, and a polyhydroxy compound (dry powder).

The concentration of sodium nitrate ($NaNO_3$) in the above formulations is about 5% to about 25%, preferably about 8% to about 20%, more preferably about 11% to about 15%, and especially about 13%. Whenever sodium nitrite ($NaNO_2$) is present in these formulations, it is in a concentration of about 5% to about 25%, preferably about 8% to about 20%, more preferably about 11% to about 15%, and especially about 13%. Whenever ammonium nitrate ($NH_4NO_3$) is present, it is in a concentration of about 10% to about 50%, preferably about 20% to about 44%, more preferably about 30% to about 38%, and especially about 34%. Whenever lithium nitrate ($LiNO_3$) is present, it is in a concentration of about 0.4% to about 10%, preferably about 0.6% to about 6%, more preferably about 0.8% to about 2%, and especially about 1%. Whenever cerium nitrate ($Ce(NO_3)_3$) and/or barium nitrate ($Ba(NO_3)_2$) are present, each are found in a concentration of about 0.5% to about 10%, preferably about 1% to about 7%, more preferably about 1.5% to about 4%, and especially about 2.5%. Finally, whenever the polyhydroxy compound is present, it is in a concentration of about 3% to about 26%, preferably about 5% to about 20%, more preferably about 7% to about 14%, and especially about 10%. The remainder of the composition is either water or a dry filler depending, respectively, on whether the composition is applied as an aqueous solution or as a dry powder. The dry filler may comprise any inert material, such as clay, diatomite, silica, alumina, and the like.

Formulations I through XVI may be added to the flue gas stream either in the form of a finely divided dry powder or as an aqueous solution. Preferably, these formulations are added in the form of an aqueous solution in order to provide for the removal of vaporous hazardous substances and for obtaining greater particulate cohesivity. However, because sodium nitrite cannot coexist with the nitrates of cerium and barium in an aqueous solution, Formulations XVII through XXVIII must consist of a dry powder. Similarly, because sodium nitrite cannot coexist with ammonium nitrate in an aqueous solution and because the combination of sodium nitrite and ammonium nitrate is unstable under the temperatures prevailing in the flue gas stream, Formulations XV through XXVIII do not comprise ammonium nitrate.

All of the above formulations have been determined by laboratory tests to be suitable for removing particulates and hazardous substances. Formulations III through VI and Formulations XVII through XX are capable of simultaneously removing particulates, hazardous substances, and $NO_x$, but Formulation VI is the preferred composition for this purpose. Formulations VII through X and Formulations XXI through XXIV are capable of simultaneously removing particulates, hazardous substances, and $SO_x$, although the composition preferred for this purpose is Formulation X. Formulations XI through XIV and Formulations XXV through XXVIII are capable of simultaneously removing particulates, hazardous substances, $NO_x$, and $SO_x$; however, the preferred composition for this purpose is Formulation XIV. It should be observed that Formulations XVII through XXVIII are less effective in removing vaporous hazardous substances because of their application as a dry powder to the flue gas stream.

Selection of a preferred formulation depends upon economic factors and whether enhanced $NO_x$ and $SO_x$ reduction is needed. For example, units burning low-sulfur coal may not require a formulation that is aimed at $SO_x$ reduction (e.g., Formulations VII through XIV and Formulations XXI through XXVIII). If neither $NO_x$ nor $SO_x$ reduction is required, one might consider sparing the expense of adding barium and cerium nitrates by using either Formulations I, II, XV, or XVI. Among these four formulations, Formulations I and II are primarily designed for use in cold-side precipitators, and Formulations XV and XVI are primarily designed for use in hot-side precipitators. With respect to Formulations I and II, Formulation II is preferred over Formulation I during cold-side precipitator operations because greater yields of particulate and hazardous substance removal is obtained with the addition of the polyhydroxy compound. Similarly, with respect to Formulations XV and XVI, Formulation XVI is generally preferred over Formulation XV in hot-side precipitator operations, particularly when the formulation is applied during periods within which the hot-side precipitator is coming on-line and off-line so as to cause the hot-side precipitator to operate in a mode somewhere between that of a hot-side and a cold-side precipitator.

Because these formulations are designed to work in conjunction with an emission control device, they are added to the flue gas stream preferably at a point upstream from the device in order to allow enhanced particulate and hazardous substance removal to occur. However, $NO_x$ and $SO_x$ reduction is still possible without regard to the location at which the formulations are introduced into the flue gas stream. For example, if the formulations for $NO_x$ and $SO_x$ removal (e.g., Formulations XI through XIV and Formulations XXV through XXVIII) are added to the flue gas stream at a point downstream from the emission control device, $NO_x$ and $SO_x$ reduction will still occur, but the concomitant benefit of particulate and hazardous substance reduction may not be obtained.

For the formulations to be effective, the temperature of the flue gas stream should be between 200° F. to 1800° F. The temperatures found in both cold-side electrostatic precipitators (which normally operate with temperatures between 250° F. to 450° F.) and hot-side electrostatic precipitators (which normally operate with temperatures between 600° F. to 800° F.) fall within the above effective temperature range. Additionally, if the aqueous form of the formulation comprises either cerium nitrate or barium nitrate, the pH level should be adjusted to a level below 2.5 to avoid cerium and/or barium precipitation.

In situations when $SO_x$ emission control is desired and the levels of calcium and magnesium as oxides comprise less than 5% of the other inorganic compounds present in the particulate, it is advantageous to increase the levels of calcium and magnesium by adding a compound containing the deficient alkaline material, such as limestone, dolomite, magnesite, lime, slaked lime, magnesium oxide, and the like, to the fuel prior to its combustion or to the flue gas stream at a point upstream from the location where the introduction of the $SO_x$-removal formulation will occur. Similarly, whenever a $SO_x$-removal formulation in dry form is applied and a low-ash fuel is burned in which the fly ash content of the fuel is less than 5%—such as in the case of oil or gaseous fuels (e.g., natural gas, cokeoven gas, refinery gas, or blast furnace gas)—these alkaline materials can be incorporated directly into the $SO_x$-removal formulation (e.g., Formulations XXI through XXVIII). The amount of alkaline materials to be added will naturally depend upon the amount of $SO_x$ removal desired; higher amounts of $SO_x$ removal will require greater amounts of alkaline materials.

The proper formulation dosage for treating the flue gas stream is best defined in terms of the Btu heat input level of the fuel being burned. Specifically, the formulations are applied with a dosage ranging between about 1.5 g to about 150 g per million Btu input, preferably between about 3 g to about 30 g per million Btu input, more preferably between about 5 g to about 30 g per million Btu input, and especially about 8 g per million Btu input. However, variations in these dosages may occur as defined by the user and the conditions prevailing in the flue gas stream (e.g., humidity, entrained particulate levels, etc.).

EXAMPLES

The following examples further demonstrate the instant invention. These examples should not, however, be construed as limiting the instant invention in any way.

Example 1

To test the effectiveness of the disclosed formulations for controlling particulates, laboratory tests were conducted that measured the sodium and ammonia levels of treated and untreated fly ash obtained from a coal-fired utility plant. A 100 g sample of fly ash from a utility plant was mixed with an aqueous solution containing 42 g of water and 0.3 g of Formulation I (consisting of 13% $NaNO_3$, 36% $NH_4NO_3$, and 1% $LiNO_3$). The paste-like sample was mixed with a spatula to ensure uniform and thorough mixing. A blank for comparison consisting of only the fly ash and water was also prepared in the same manner. Both samples were then dried overnight in an oven maintained at 220° F. (±10° F.). Thereafter, the samples were crushed and ground to a fine powder. A two-gram portion of each of the ground samples was then mixed separately with 200 g of distilled water and shaken thoroughly. The samples were filtered and the supernatants analyzed to determine the levels of sodium and ammonia. The results of these laboratory tests are reported in TABLE I.

TABLE I

| | Analysis of Untreated Fly Ash and Fly Ash Treated with Formulation I | |
|---|---|---|
| System | Sodium | Ammonia |
| Untreated Ash | 220 ppm | <50 ppm |
| Treated Ash | 545 ppm | <50 ppm |

As illustrated in TABLE I, the level of supernatant sodium doubled when the fly ash was treated with Formulation I, indicating the addition of sodium to the fly ash, while the level of supernatant ammonia remained largely unchanged. By increasing the level of sodium (derived from sodium nitrate) without obtaining a corresponding increase in the level of ammonia (derived from ammonium nitrate), the tests reveal that Formulation I is effective in lowering the resistivity of fly ash (thus providing improved electrostatic precipitator performance) without producing undesirable ammonia residue in the fly ash.

Example 2

Laboratory tests were also conducted to study the thermal properties (and physical state) of various nitrate and nitrite salt combinations. To perform this study, formulations containing nitrite and nitrate salt combinations were diluted in distilled water. The mixture ratios by weight of nitrite and nitrate salts in the formulations are delineated in TABLE II. For example, 5 g of technical grade sodium nitrate (Chilean Nitrate Corporation, Norfolk, Va.) and 5 g of technical grade lithium nitrate (Cyprus Foote Mineral Company, Kings Mountain, N.C.) was dissolved in 20 g of distilled water to prepare a mixture of 1:1 by weight sodium nitrate and lithium nitrate.

A 5 g to 10 g sample of each aqueous solution was placed in a pre-weighed porcelain crucible and dried overnight at 230° F. (±10° F.). The samples were then cooled in a desiccator and the weight recorded after cooling. The samples were again placed in an oven maintained at specified temperatures (see TABLE II), and after two hours, their physical state was noted. Thereafter, the samples were re-cooled and re-weighed to determine the weight loss after the second heating. The results from these tests are reported in TABLE II.

TABLE II

| | Thermal Properties of Some Formulated Mixtures | | | |
|---|---|---|---|---|
| % Component | 270° F./% wt loss | 300° F./% wt loss | 350° F./% wt loss | 420° F./% wt loss |
| 1:1 by wt. $NaNO_3/LiNO_3$ | solid/none | solid/none | semi solid/0.7 | molten/1.7 |
| 4:1 by wt. $NaNO_3/LiNO_3$ | solid/none | solid/none | semi solid/0.6 | molten/0.5 |
| 5:1 by wt. $NaNO_3/Ce(NO_3)_3$ | solid/none | solid/none | solid/3.2 | semi solid/6.0 |
| 4.5:4.5:1 by wt. $NaNO_3/NH_4NO_3/Ce(NO_3)_3$ | molten/none | molten/† | solid/5.0 | molten/15.8 |

TABLE II-continued

Thermal Properties of Some Formulated Mixtures

| % Component | 270° F./% wt loss | 300° F./% wt loss | 350° F./% wt loss | 420° F./% wt loss |
|---|---|---|---|---|
| 25:65:5:5 by wt. $NaNO_3/NH_4NO_3/Ce(NO_3)_3/Ba(NO_3)_2$ | semi molten/† | molten/† | molten/† | molten/3.1 |
| 6:3:1 by wt. $NaNO_3/NaNO_2/LiNO_3$ | solid/none | solid/none | solid/none | molten/none |

†Percentage weight loss not available

As shown in TABLE II, the stated combinations of sodium nitrate, sodium nitrite, ammonium nitrate, lithium nitrate, cerium nitrate, and barium nitrate are stable at temperatures well above 270° F. and remain as a liquid. Depending upon the temperature of the flue gas stream during a particular application, a selection of an appropriate formulation may be made by the user to achieve optimal emission control.

Example 3

Further laboratory tests were performed to determine the moisture absorption capacities of combinations of sodium nitrate, ammonium nitrate, lithium nitrate, and cerium nitrate at various humidities. An aqueous solution of a given composition (see TABLE III) was weighed in a pre-weighed porcelain crucible and then dried overnight at 230° F. (±10° F.). After the dried composition was cooled, it was weighed quickly to avoid moisture absorption from the atmosphere and placed in a glass desiccator containing about 12% to about 18% sulfuric acid solution in distilled water. It is known that a 11.02% solution of sulfuric acid in a closed container maintains a humidity of 95% and that a solution of 17.91% sulfuric acid maintains a humidity of 90% at 70° F. The crucibles were left in the desiccator until the weight changes between successive weight measures became negligible. This process required approximately 50 to 100 hours of equilibration depending upon the composition being tested. The moisture absorption percentages measured during these tests are reported in TABLE III.

cerium nitrate resulted in varying moisture absorption percentages, depending upon how these nitrates were combined. Although one would expect the moisture absorption capacity of a composition comprising 100% lithium nitrate to be higher when compared to a composition comprising only 50% lithium nitrate (e.g., 1:1 $LiNO_3/Ce(NO_3)_3$), the moisture absorption capacity largely remained the same. This result indicates that there is a synergistic effect in the combination of lithium nitrate and the other nitrates that were tested.

Example 4

Finally, laboratory data was obtained on the cohesion properties of plant fly ash with various formulations. For this purpose, fly ash obtained from a plant was treated with the formulations illustrated in TABLE IV.

TABLE III

Moisture Absorption Studies*

| Composition | $NH_4NO_3$ | $LiNO_3$ | 1:1 - $LiNO_3/Ce(NO_3)_3$ | 6:4 - $NH_4NO_3/Ce(NO_3)_3$ | 4:4:1 - $NaNO_3/NH_4NO_3/LiNO_3$ | 4:1 - $NH_4NO_3/LiNO_3$ |
|---|---|---|---|---|---|---|
| Moisture absorption % | 3.7 | 80 | 81.3 | 7.7 | 22.97 | 42.3 |

*Moisture absorption at 70° F. @ 90–95% RH

As illustrated in TABLE III, the stated combinations of sodium nitrate, ammonium nitrate, lithium nitrate, and

TABLE IV

Formulations (in $H_2O$) for Particulate, Hazardous Substances, $NO_x$, and $SO_x$ Removal

| Formulation | % $NaNO_3$ | % $NH_4NO_3$ | % $LiNO_3$ | % $Ba(NO_3)_2$ | % $Ce(NO_3)_3$ | % $NO_3$ | % Sucrose | pH |
|---|---|---|---|---|---|---|---|---|
| I | 13 | 36 | 1 | 0 | 0 | 38.6 | 0 | 6 |
| II | 13 | 36 | 1 | 0 | 0 | 38.6 | 10 | 6 |
| III | 13 | 36 | 0 | 0 | 2.5 | 38.6 | 0 | 1.5 |
| XI | 13 | 34 | 0 | 2.5 | 2.5 | 38.6 | 0 | 1.5 |
| XIII | 13 | 34 | I | 2.5 | 2.5 | 38.6 | 0 | 1.5 |

0.5 g, 1 g, and 5 g of the above formulations were each diluted with about 40 g water and then mixed separately with 100 g of fly ash. A blank for comparison was prepared by mixing 100g of fly ash with about 40 g of water. Additional samples (Samples A, B, and C as reflected in TABLE V) were prepared in the same manner used for preparing the above formulations. All of these fly ash mixtures were of a paste consistency. The mixtures were then dried overnight at 220° F. After drying, the mixtures were crushed to a powder.

Each of the fly ash mixtures were then rolled in a pan at room temperature for 5 minutes. Rolling produced "balling" of various sizes in the rolled fly ash mixtures. The number and size of the balls indicated the agglomeration or inducement of cohesion by the formulation. A system of rating on a visual scale of 0 (no agglomeration) to 10 (maximum agglomeration) for agglomeration occurring in more than one half of the tested fly ash mixture was used to judge the formulations' effectiveness. As illustrated in TABLE V, all of the above formulations produced significant levels of agglomeration over no treatment; the formulations also produced more agglomeration than Samples A, B, and C (compositions noted in TABLE V) that were tested for comparison.

$NO_x$, and $SO_x$ with favorable results. The field tests were conducted with Formulations I, III, V, and XI on a 350-megawatt power generating unit in the midwestern United States.

The tests performed with selected formulations were conducted by first diluting the formulations with plant well water in the ratio by volume of 1 part product with 5 to 10 parts of water. Each diluted formulation was then injected in atomized form into four gas ducts upstream from the electrostatic precipitator (only one formulation was used per test) at a combined dosage rate of 6.3 g to 28 g per million Btu input. Adequate atomization was achieved by injecting the formulations through a set of eight, internally mixed dual-fluid nozzles (two nozzles per duct), wherein compressed air was used as the atomizing fluid. The nozzles used in these tests are well known in the art and are available from either Spraying Systems of Wheaton, Ill. or Bete Fog Jet of Greenfield, Mass., among others. Although compressed air was used to atomize the diluted product in this instance, steam could have been used equally well.

Fly ash samples during each test were collected for analysis and their quality examined with respect to their acceptability as "cement aggregate." The breakdown of components from a typical untreated fly ash sample obtained from the test site is reported in TABLE VI (the range of high and low values for each component covered a spread of ±10%).

TABLE VI

| Analysis of the Fly Ash (Before Treatment) | | | | | | | | | |
|---|---|---|---|---|---|---|---|---|---|
| % $Al_2O_3$ | % $Fe_2O_3$ | % $SiO_2$ | % CaO | % MgO | % $SO_3$ | % $Na_2O$ | % $K_2O$ | % Moist. | % LOI* |
| 20.5 | 5.5 | 42.8 | 23.4 | 4.6 | 1.5 | 1.2 | 0.3 | 0.1 | 0.3 |

*LOI = Loss on ignition

TABLE V

Agglomeration Level of Fly Ash with Various Treatments

| Treatment Description | Agglomeration Level |
|---|---|
| Fly Ash (without treatment) | <0.5 |
| Fly Ash with Sample A (20% $NaNO_3$ & 80% $H_2O$) | ~1 |
| Fly Ash with Sample B (50% $NH_4NO_3$ & 50% $H_2O$) | ~3 |
| Fly Ash with Sample C (25% $NaNO_3$ & 25% $NH_4NO_3$ & 50% $H_2O$) | ~5 |
| Fly Ash with Formulation I | ~7 |
| Fly Ash with Formulation II | ~8 |
| Fly Ash with Formulation III | ~8 |
| Fly Ash with Formulation XI | ~8 |
| Fly Ash with Formulation XIII | ~6 |

The laboratory test results described above in EXAMPLES 1 through 4 indicate that the formulations disclosed herein are effective in lowering the resistivity of particulates by increasing particulate sodium levels, they are stable at temperatures well above 270° F. and remain as a liquid, and they improve particulate cohesivity by enhancing both the moisture-absorption capacities and agglomeration properties of particulates.

Example 5

A series of field tests were also conducted to test the effectiveness of the formulations in removing particulates, The typical properties (with high and low values) of the coal used in these tests are provided in TABLE VII.

TABLE VII

Analysis of Coal

| Coal Parameter | Analysis (Hi/Lo) |
|---|---|
| % Moisture | 27 (27.8/26.5) |
| % Fly Ash | 5.2 (6.5/4.4) |
| % Sulfur | 0.25 (0.37/0.22) |
| % $Na_2O$ | 1.3 (1.6/0.99) |
| Btu/lb. | 8700 (8900/8600) |

Several parameters were monitored. They included metered opacities (instantaneous and six-minute averages), electrostatic precipitator power levels, $NO_x$ and $SO_x$ data from the Continuous Emission Analyzer, flue gas temperatures, power generation (megawatts), and data on the coal being burned (quantity and quality). A comparison was also made of the results obtained with a commercial additive that the plant had been using for several years for particulate control.

The chemical and physical analyses of the fly ash samples treated with Formulations I, V, and XI, together with the ASTM test results (ASTM C618) on the acceptability as "cement aggregate" of each sample, are reported respectively in TABLES VIII through X.

TABLE VIII

Chemical Analysis of Fly Ash (With Treatment)

| Parameter | ASTM C618 Specification | Formulation I | Formulation V | Formulation XI |
|---|---|---|---|---|
| % Aluminum Oxide | | 19.43 | 19.83 | 20.01 |
| % Iron Oxide | | 5.18 | 5.07 | 5.25 |
| % Silica | | 42.32 | 40.67 | 39.63 |
| % Sum of AL, FE, and SI Oxides | 50 Min. | 66.93 | 65.57 | 64.89 |
| % Calcium Oxide | | 23.54 | 24.16 | 25.01 |
| % Magnesium Oxide | | 4.38 | 4.73 | 4.95 |
| % Sulfur Trioxide | 5.0 Max. | 1.50 | 1.64 | 1.62 |
| % Available Alkali | 1.5 Max. | 1.40 | 1.40 | 1.20 |
| % Available Sodium Oxide | | 1.20 | 1.20 | 1.00 |
| % Available Potassium Oxide | | 0.36 | 0.35 | 0.29 |

TABLE IX

Physical Analysis of Fly Ash (With Treatment)

| Parameter | ASTM C618 Specification | Formulation I | Formulation V | Formulation XI |
|---|---|---|---|---|
| Percentage retained on 325 Sieve | 34.0 Max. | 16.28 | 18.26 | 25.55 |
| Percentage moisture in ash | 3.0 Max. | 0.02 | 0.01 | 0.02 |
| Percentage lost on ignition | 6.0 Max. | 0.33 | 0.37 | 0.37 |
| $H_2O$ requirement (% control) | 105 Max. | 102.50 | 102.50 | 102.50 |
| Autoclave expansion | 0.8 Max. | 0.012 | 0.023 | 0.031 |
| Specific gravity | | 2.59 | 2.56 | 2.56 |

TABLE X

Pozzolanic Activity Index for Fly Ash (With Treatment)

| Parameter | ASTM C618 Specification | Formulation I | Formulation V | Formulation XI |
|---|---|---|---|---|
| Percentage of cement control | 75 Min. | 111.26 | 101.21 | 87.51 |
| PSI of cement control | | 4138 | 4138 | 4138 |
| PSI of Sample | | 4604 | 4188 | 3621 |

From TABLES VIII through X, it is evident that the treated fly ash samples met all of the criteria set by ASTM in its test method C618 and had acceptable "cement aggregate" qualities.

Figure 1:
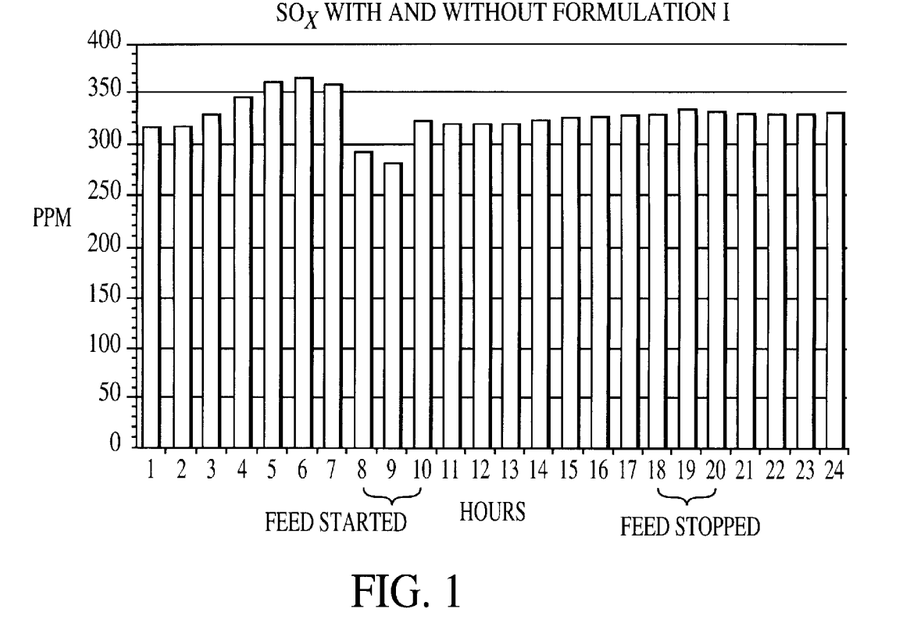
FIG. 1 is a graphical illustration reflecting the levels of $SO_x$ when Formulation I was introduced to a flue gas stream.
Figure 2:
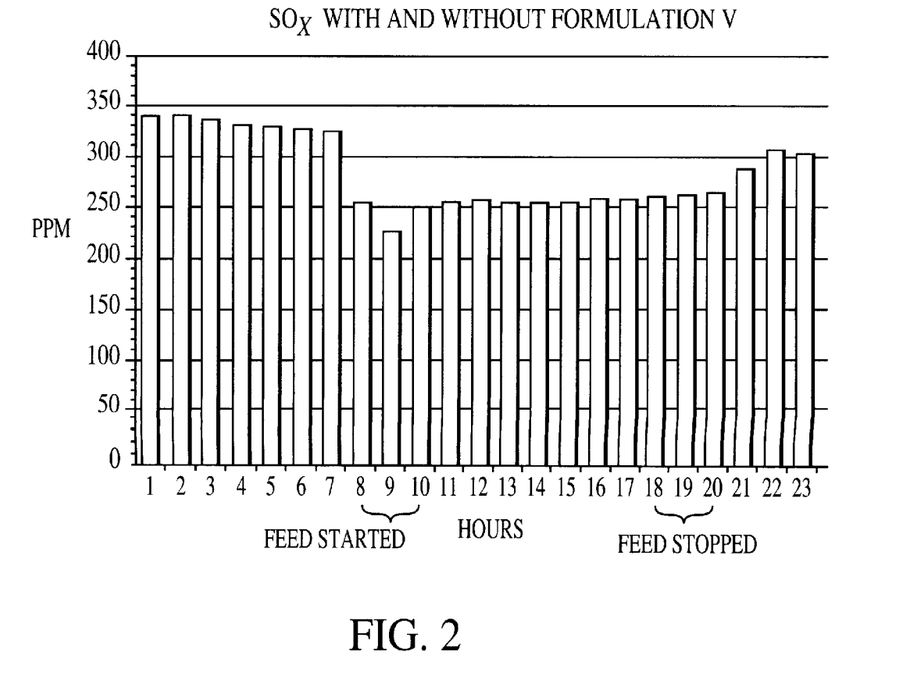
FIG. 2 is a graphical illustration reflecting the levels of $SO_x$ when Formulation V was introduced to a flue gas stream.
Figure 3:
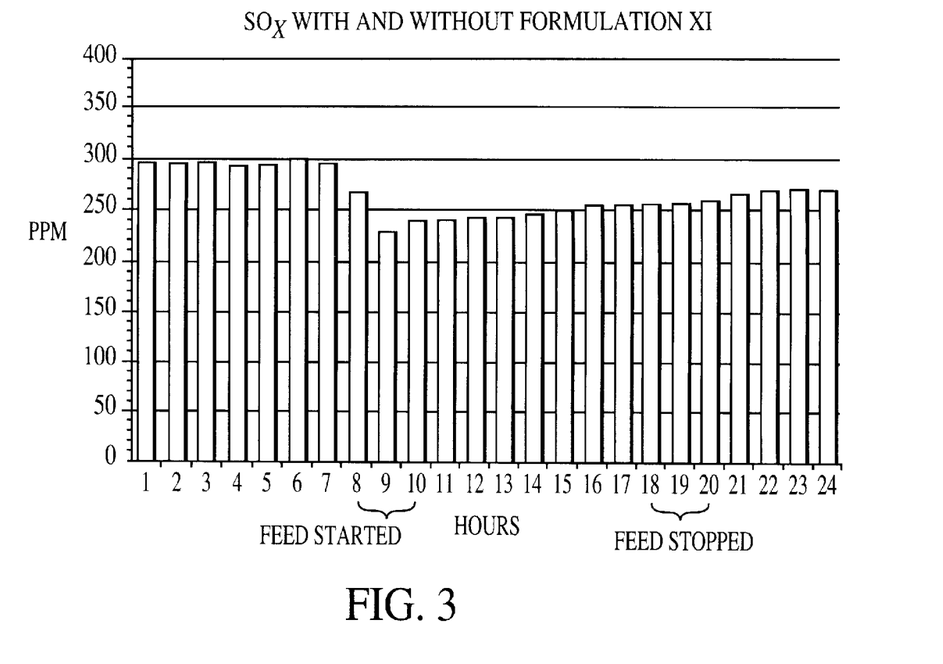
FIG. 3 is a graphical illustration reflecting the levels of $SO_x$ when Formulation XI was introduced to a flue gas stream.
Figure 4:
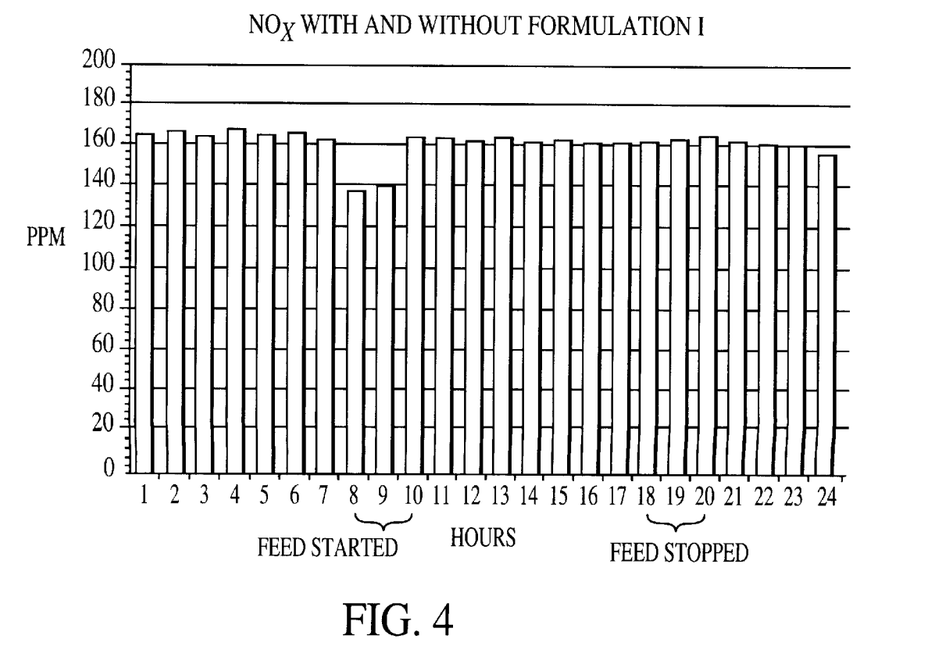
FIG. 4 is a graphical illustration reflecting the levels of $NO_x$ when Formulation I was introduced to a flue gas stream.
Figure 5:
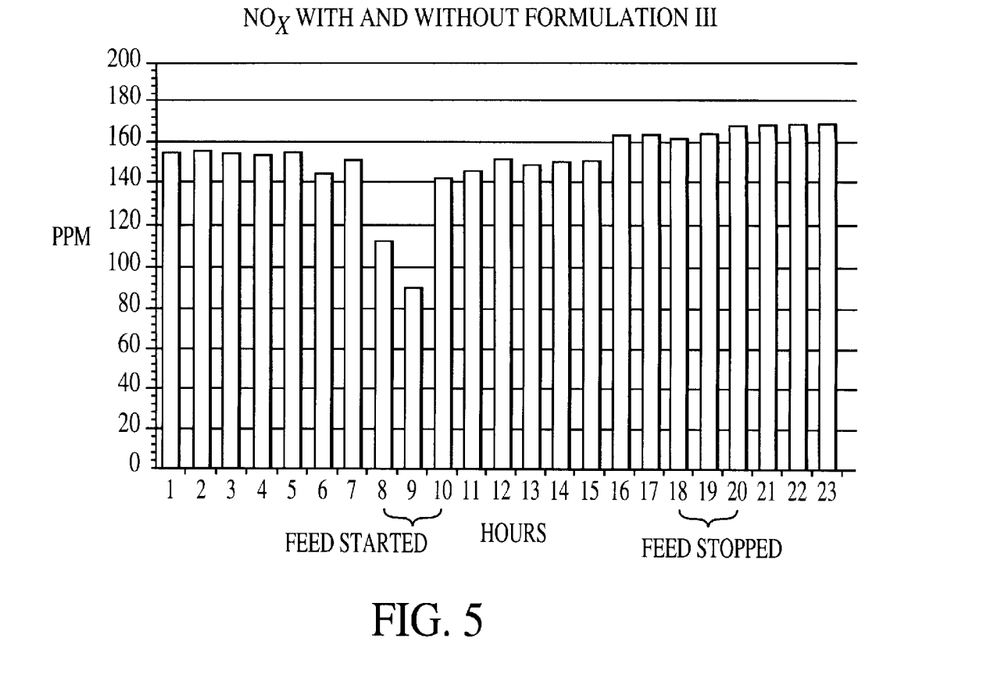
FIG. 5 is a graphical illustration reflecting the levels of $NO_x$ when Formulation III was introduced to a flue gas stream.
Figure 6:
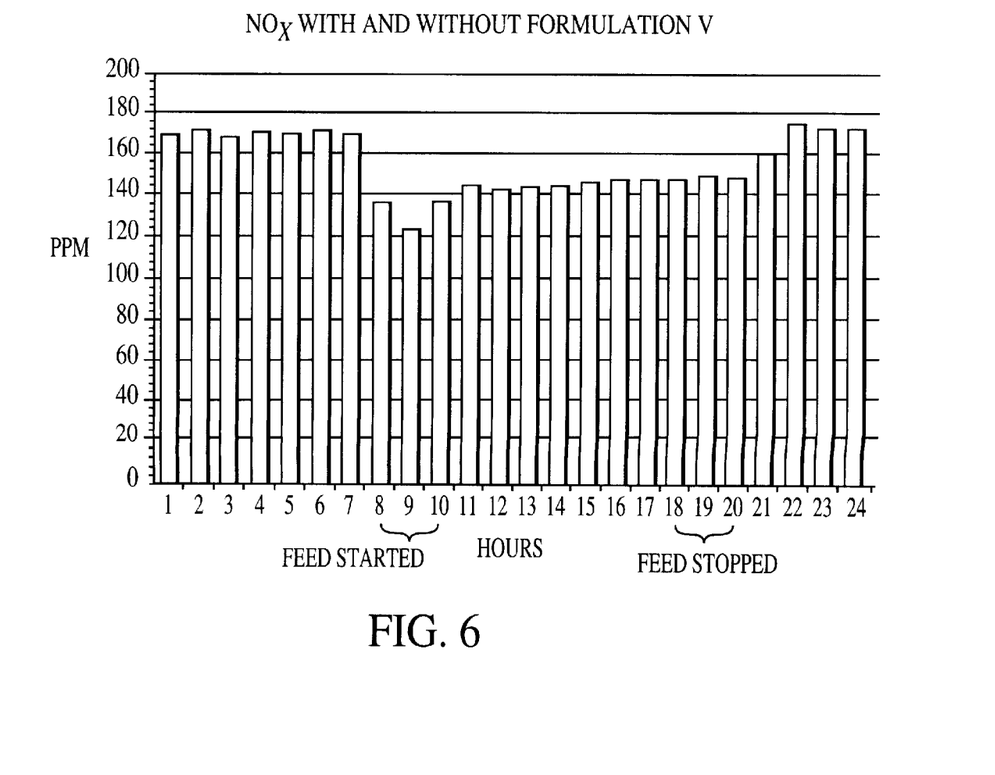
FIG. 6 is a graphical illustration reflecting the levels of $NO_x$ when Formulation V was introduced to a flue gas stream.
Figure 7:
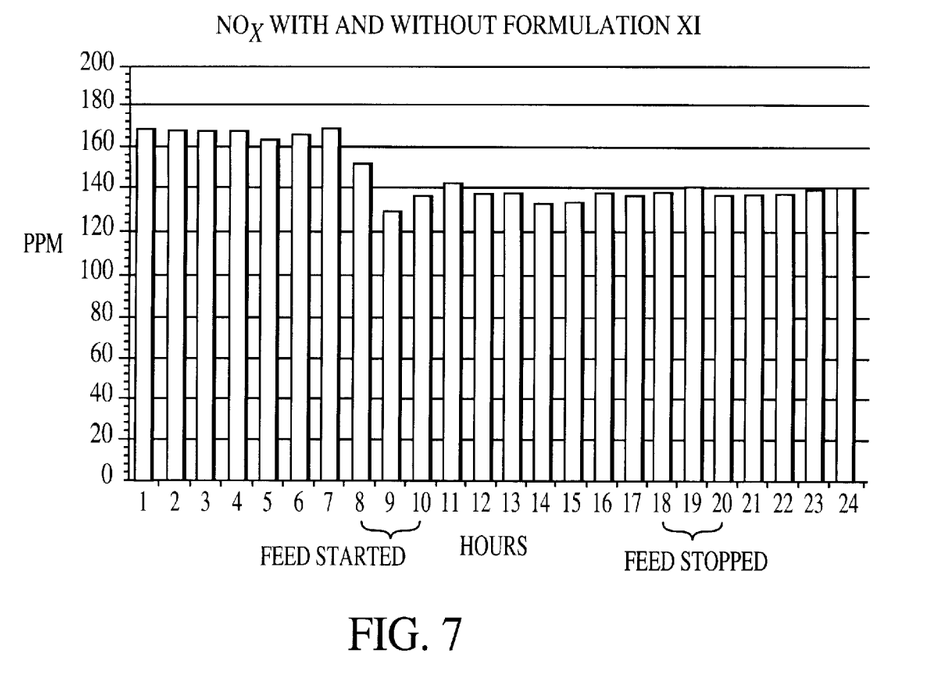
FIG. 7 is a graphical illustration reflecting the levels of $NO_x$ when Formulation XI was introducted to a flue gas stream.

The field-tested formulations were determined to significantly improve the performance of the electrostatic precipitator based on the observed decrease in opacity levels in the flue gas stream. Lowered particulate resistivity was evident from the increased levels of primary and secondary currents in the precipitator and decreased levels of sparking. Increased particulate cohesivity was evidenced by lowered opacity spikes, which are generally attributable to the reintroduction of collected particulates into the flue gas stream whenever the collecting plates are cleaned by mechanical vibration or rapping. Moreover, the data obtained from the Continuous Emission Analyzer demonstrated that the formulations were also effective in reducing $NO_x$ and $SO_x$ emissions as is graphically illustrated in FIGS. 1 through 7.

Although the present invention has been described in considerable detail with reference to certain preferred versions thereof, other versions are possible. The above description is for the purpose of teaching the person of ordinary skill in the art how to practice the present invention, and it is not intended to detail all obvious modifications and variations that will become apparent to the skilled worker upon reading the description. It is intended, however, that all such obvious modifications and variations be included within the scope of the present invention which is defined by the following claims. Accordingly, the spirit and scope of the appended claims should not be limited to the description of the preferred versions contained herein.

What is claimed is:

1. A compostion for use with an emission control device to remove particulates and hazardous substances from a flue gas stream, said composition located at a point upstream of said emission control device and comprising a salt selected from the group consisting essentially of sodium nitrate, sodium nitrite, ammonium nitrate, lithium nitrate, and mixtures thereof, provided that the composition does not comprise ammonium nitrate and sodium nitrite at the same time.

2. The composition according to claim 1, wherein the composition comprises about 5% to about 25% sodium nitrate, 0% to about 25% sodium nitrite, 0% to about 50% ammonium nitrate, and 0% to about 10% lithium nitrate.

3. The composition according to claim 2, wherein the composition comprises about 8% to about 20% sodium nitrate, 0% to about 20% sodium nitrite, 0% to about 44% ammonium nitrate, and 0% to about 6% lithium nitrate.

4. The composition according to claim 3, wherein the composition comprises about 11% to about 15% sodium nitrate, 0% to about 15% sodium nitrite, 0% to about 38% ammonium nitrate, and 0% to about 2% lithium nitrate.

5. The composition according to claim 1, further comprising a polyhydroxy compound.

6. The composition according to claim 5, wherein the polyhydroxy compound is selected from the group consisting essentially of sucrose, fructose, glucose, glycerol, and mixtures thereof.

7. The composition according to claim 6, wherein the composition comprises about 3% to about 26% of the polyhydroxy compound.

8. The composition according to claim 7, wherein the composition comprises about 5% to about 20% of the polyhydroxy compound.

9. The composition according to claim 8, wherein the composition comprises about 7% to about 14% of the polyhydroxy compound.

10. A composition for use with an emission control device to simultaneously remove particulates, hazardous substances, and $NO_x$ from a flue gas stream, said composition located at a point upstream of said emission control device and comprising cerium nitrate and a salt selected from the group consisting essentially of sodium nitrate, sodium nitrite, ammonium nitrate, lithium nitrate, and mixtures thereof, provided that the composition does not comprise ammonium nitrate and sodium nitrite at the same time and further provided that the composition consists of a dry powder when sodium nitrite is present.

11. The composition according to claim 10, wherein the composition comprises about 5% to about 25% sodium nitrate, 0% to about 25% sodium nitrite, 0% to about 50% ammonium nitrate, 0% to about 10% lithium nitrate, and about 0.5% to about 10% cerium nitrate.

12. The composition according to claim 11, wherein the composition comprises about 8% to about 20% sodium nitrate, 0% to about 20% sodium nitrite, 0% to about 44% ammonium nitrate, 0% to about 6% lithium nitrate, and about 1% to about 7% cerium nitrate.

13. The composition according to claim 12, wherein the composition comprises about 11% to about 15% sodium nitrate, 0% to about 15% sodium nitrite, 0% to about 38% ammonium nitrate, 0% to about 2% lithium nitrate, and about 1.5% to about 4% cerium nitrate.

14. The composition according to claim 10, further comprising a polyhydroxy compound.

15. The composition according to claim 14, wherein the polyhydroxy compound is selected from the group consisting essentially of sucrose, fructose, glucose, glycerol, and mixtures thereof.

16. The composition according to claim 15, wherein the composition comprises about 3% to about 26% of the polyhydroxy compound.

17. The composition according to claim 16, wherein the composition comprises about 5% to about 20% of the polyhydroxy compound.

18. The composition according to claim 17, wherein the composition comprises about 7% to about 14% of the polyhydroxy compound.

19. A composition for use with an emission control device to simultaneously remove particulates, hazardous substances, and $SO_x$ from a flue gas stream, said composition located at a point upstream of said emission control device and comprising a salt selected from the group consisting essentially of sodium nitrate, sodium nitrite, ammonium nitrate, lithium nitrate, barium nitrate, and mixtures thereof, provided that the composition does not comprise ammonium nitrate and sodium nitrite at the same time and further provided that the composition consists of a dry powder when both sodium nitrite and barium nitrate are present.

20. The composition according to claim 19, wherein the composition comprises about 5% to about 25% sodium nitrate, 0% to about 25% sodium nitrite, 0% to about 50% ammonium nitrate, 0% to about 10% lithium nitrate, and 0% to about 10% barium nitrate.

21. The composition according to claim 20, wherein the composition comprises about 8% to about 20% sodium nitrate, 0% to about 20% sodium nitrite, 0% to about 44% ammonium nitrate, 0% to about 6% lithium nitrate, and 0% to about 7% barium nitrate.

22. The composition according to claim 21, wherein the composition comprises about 11% to about 15% sodium nitrate, 0% to about 15% sodium nitrite, 0% to about 38% ammonium nitrate, 0% to about 2% lithium nitrate, and 0% to about 4% barium nitrate.

23. The composition according to claim 19, further comprising a polyhydroxy compound.

24. The composition according to claim 23, wherein the polyhydroxy compound is selected from the group consisting essentially of sucrose, fructose, glucose, glycerol, and mixtures thereof.

25. The composition according to claim 24, wherein the composition comprises about 3% to about 26% of the polyhydroxy compound.

26. The composition according to claim 25, wherein the composition comprises about 5% to about 20% of the polyhydroxy compound.

27. The composition according to claim 26, wherein the composition comprises about 7% to about 14% of the polyhydroxy compound.

28. A composition for use with an emission control device to simultaneously remove particulates, hazardous substances, $NO_x$, and $SO_x$ from a flue gas stream, said composition located at a point upstream of said emission control device and comprising cerium nitrate and a salt selected from the group consisting essentially of sodium nitrate, sodium nitrite, ammonium nitrate, lithium nitrate, barium nitrate, and mixtures thereof, provided that the composition does not comprise ammonium nitrate and sodium nitrite at the same time and further provided that the composition consists of a dry powder when sodium nitrite is present.

29. The composition according to claim 28, wherein the composition comprises about 5% to about 25% sodium nitrate, 0% to about 25% sodium nitrite, 0% to about 50% ammonium nitrate, 0% to about 10% lithium nitrate, 0% to about 10% barium nitrate, and about 0.5% to about 10% cerium nitrate.

30. The composition according to claim 29, wherein the composition comprises about 8% to about 20% sodium nitrate, 0% to about 20% sodium nitrite, 0% to about 44% ammonium nitrate, 0% to about 6% lithium nitrate, 0% to about 7% barium nitrate, and about 1% to about 7% cerium nitrate.

31. The composition according to claim 30, wherein the composition comprises about 11% to about 15% sodium nitrate, 0% to about 15% sodium nitrite, 0% to about 38% ammonium nitrate, 0% to about 2% lithium nitrate, 0% to about 4% barium nitrate, and about 1.5% to about 4% cerium nitrate.

32. The composition according to claim 28, further comprising a polyhydroxy compound.

33. The composition according to claim 32, wherein the polyhydroxy compound is selected from the group consisting essentially of sucrose, fructose, glucose, glycerol, and mixtures thereof.

34. The composition according to claim 33, wherein the composition comprises about 3% to about 26% of the polyhydroxy compound.

35. The composition according to claim 34, wherein the composition comprises about 5% to about 20% of the polyhydroxy compound.

36. The composition according to claim 35, wherein the composition comprises about 7% to about 14% of the polyhydroxy compound.

37. A method for removing particulates and hazardous substances from a flue gas stream, comprising adding a composition to the flue gas stream at a point upstream of an emission control device, wherein the composition is selected from an aqueous solution and a dry powder and comprises a salt selected from the group consisting essentially of sodium nitrate, sodium nitrite, ammonium nitrate, lithium nitrate, and mixtures thereof, provided that the composition does not comprise ammonium nitrate and sodium nitrite at the same time.

38. A method as set forth in claim 37, wherein the composition further comprises a polyhydroxy compound.

39. A method as set forth in claim 38, wherein the polyhydroxy compound is selected from the group consisting essentially of sucrose, fructose, glucose, glycerol, and mixtures thereof.

40. A method for simultaneously removing particulates, hazardous substances, and $NO_x$ from a flue gas stream, comprising adding a composition to the flue gas stream at a point upstream of an emission control device, wherein the composition is selected from an aqueous solution and a dry powder and comprises cerium nitrate and a salt selected from the group consisting essentially of sodium nitrate, sodium nitrite, ammonium nitrate, lithium nitrate, and mixtures thereof, provided that the composition does not comprise ammonium nitrate and sodium nitrite at the same time and further provided that the composition consists of a dry powder when sodium nitrite is present.

41. A method as set forth in claim 40, wherein the composition further comprises a polyhydroxy compound.

42. A method as set forth in claim 41, wherein the polyhydroxy compound is selected from the group consisting essentially of sucrose, fructose, glucose, glycerol, and mixtures thereof.

43. A method for simultaneously removing particulates, hazardous substances, and $SO_x$ from a flue gas stream, comprising adding a composition to the flue gas stream at a point upstream of an emission control device, wherein the composition is selected from an aqueous solution and a dry powder and comprises a salt selected from the group consisting essentially of sodium nitrate, sodium nitrite, ammonium nitrate, lithium nitrate, barium nitrate, and mixtures thereof, provided that the composition does not comprise ammonium nitrate and sodium nitrite at the same time and further provided that the composition consists of a dry powder when both sodium nitrite and barium nitrate are present.

44. A method as set forth in claim 43, wherein the composition further comprises a polyhydroxy compound.

45. A method as set forth in claim 44, wherein the polyhydroxy compound is selected from the group consisting essentially of sucrose, fructose, glucose, glycerol, and mixtures thereof.

46. A method for simultaneously removing particulates, hazardous substances, $NO_x$, and $SO_x$ from a flue gas stream, comprising adding a composition to the flue gas stream at a point upstream of an emission control device, wherein the composition is selected from an aqueous solution and a dry powder and comprises cerium nitrate and a salt selected from the group consisting essentially of sodium nitrate, sodium nitrite, ammonium nitrate, lithium nitrate, barium nitrate, and mixtures thereof, provided that the composition does not comprise ammonium nitrate and sodium nitrite at the same time and further provided that the composition consists of a dry powder when sodium nitrite is present.

47. A method as set forth in claim 46, wherein the composition further comprises a polyhydroxy compound.

48. A method as set forth in claim 47, wherein the polyhydroxy compound is selected from the group consisting essentially of sucrose, fructose, glucose, glycerol, and mixtures thereof.

49. A method for removing $NO_x$ from a flue gas stream, comprising adding a composition to the flue gas stream, at a point upstream of an emission control device, wherein the composition is selected from an aqueous solution and a dry powder and comprises cerium nitrate and a salt selected from the group consisting essentially of sodium nitrate, sodium nitrite, ammonium nitrate, lithium nitrate, and mixtures thereof, provided that the composition does not comprise ammonium nitrate and sodium nitrite at the same time and further provided that the composition consists of a dry powder when sodium nitrite is present.

50. A method for removing $SO_x$ from a flue gas stream, comprising adding a composition to the flue gas stream, at a point upstream of an emission control device, wherein the composition is selected from an aqueous solution and a dry powder and comprises a salt selected from the group consisting essentially of sodium nitrate, sodium nitrite, ammonium nitrate, lithium nitrate, barium nitrate, and mixtures thereof, provided that the composition does not comprise ammonium nitrate and sodium nitrite at the same time and further provided that the composition consists of a dry powder when both sodium nitrite and barium nitrate are present.

51. A method for simultaneously removing $NO_x$ and $SO_x$ from a flue gas stream, comprising adding a composition to the flue gas stream at a point upstream of an emission control device, wherein the composition is selected from an aqueous solution and a dry powder and comprises cerium nitrate and a salt selected from the group consisting essentially of sodium nitrate, sodium nitrite, ammonium nitrate, lithium nitrate, barium nitrate, and mixtures thereof, provided that the composition does not comprise ammonium nitrate and sodium nitrite at the same time and further provided that the composition consists of a dry powder when sodium nitrite is present.

* * * * *